(12) United States Patent
Ramasamy et al.

(10) Patent No.: US 8,423,980 B1
(45) Date of Patent: Apr. 16, 2013

(54) METHODS FOR HANDLING INLINED FUNCTIONS USING SAMPLE PROFILES

(75) Inventors: Vinodha Ramasamy, Sunnyvale, CA (US); Dehao Chen, Beijing (CN); Peng Yuan, Beijing (CN)

(73) Assignee: Google Inc., Mountain View, CA (US)

( * ) Notice: Subject to any disclaimer, the term of this patent is extended or adjusted under 35 U.S.C. 154(b) by 1058 days.

(21) Appl. No.: 12/346,638

(22) Filed: Dec. 30, 2008

Related U.S. Application Data

(60) Provisional application No. 61/098,191, filed on Sep. 18, 2008.

(51) Int. Cl.
*G06F 9/44* (2006.01)
*G06F 9/45* (2006.01)

(52) U.S. Cl.
USPC ............ 717/140; 717/124; 717/151; 717/157

(58) Field of Classification Search .................. None
See application file for complete search history.

(56) References Cited

U.S. PATENT DOCUMENTS

| | | | |
|---|---|---|---|
| 7,073,167 B2 * | 7/2006 | Iwashita ..................... 717/151 |
| 7,096,390 B2 * | 8/2006 | Talcott et al. ................ 717/127 |
| 7,155,708 B2 * | 12/2006 | Hammes et al. ............. 717/157 |
| 7,343,594 B1 * | 3/2008 | Metzgen ...................... 717/140 |
| 7,996,825 B2 * | 8/2011 | Chakrabarti et al. ........ 717/140 |
| 8,281,290 B2 * | 10/2012 | Thompson .................... 717/157 |
| 2003/0217327 A1 * | 11/2003 | Ogasawara ................... 717/151 |
| 2004/0088685 A1 * | 5/2004 | Poznanovic et al. ......... 717/140 |
| 2004/0088689 A1 * | 5/2004 | Hammes ....................... 717/140 |
| 2004/0205729 A1 * | 10/2004 | Iwashita ....................... 717/140 |
| 2005/0097528 A1 * | 5/2005 | Chakrabarti et al. ......... 717/140 |
| 2005/0204349 A1 * | 9/2005 | Lewis et al. .................. 717/162 |
| 2006/0041872 A1 * | 2/2006 | Poznanovic et al. ......... 717/140 |
| 2006/0130021 A1 * | 6/2006 | Plum et al. ................... 717/140 |
| 2007/0250825 A1 * | 10/2007 | Hicks et al. .................. 717/151 |
| 2010/0064279 A1 * | 3/2010 | Stewart ........................ 717/124 |
| 2012/0030659 A1 * | 2/2012 | Porras et al. ................. 717/151 |

OTHER PUBLICATIONS

Roy Levin et al., Complementing Missing and Inaccurate Profiling Using a Minimum Cost Circulation Algorithm, 2008, Springer-Verlag Berlin Heidelberg, pp. 291-304.*

Aaron Smith et al.; Compiling for EDGE Architectures; IEEE 2006; retrieved online on Feb. 7, 2013; pp. 1-11; Retrieved from the Internet: <URL: http://delivery.acm.org/10.1145/1130000/1122404/24990185.pdf?>.*

Kim Hazelwood and David Grove; Adaptive Online Context-Sensitive Inlining; IEEE 2003; retrieved online on Feb. 7, 2013; pp. 1-12; Retrieved from the Internet: <URL: http://delivery.acm.org/10.1145/780000/776289/p253-hazelwood.pdf?>.*

Matthew Arnold and David Grove; Collecting and Exploiting High-Accuracy Call Graph Profiles in Virtual Machines; [2005]; retrieved online on Feb. 7, 2013; Retrieved from the Internet: <URL: http://ieeexplore.ieee.org/stamp/stamp.jsp?tp=&arnumber=1402076>.*

* cited by examiner

*Primary Examiner* — Thuy Dao
*Assistant Examiner* — Hanh T Bui
(74) *Attorney, Agent, or Firm* — Honigman Miller Schwartz and Cohn LLP

(57) ABSTRACT

While optimizing executable code, compilers traditionally make static determinations about whether or not to inline functions. Embodiments of the invention convert dynamic hardware-event sampling information into context-specific edge frequencies, which can be used to make inlining decisions for functions.

12 Claims, 3 Drawing Sheets

METHODS FOR HANDLING INLINED FUNCTIONS USING SAMPLE PROFILES

RELATED APPLICATION

This application hereby claims priority under 35 U.S.C. §119 to U.S. Provisional Application No. 61/098,191, entitled "Methods for Handling Inlined Functions using Sample Profiles," by inventors Vinodha Ramasamy, Dehao Chen, and Paul Yuan, filed on 18 Sep. 2008.

BACKGROUND

Field

The present embodiments relate to techniques for compiling applications for optimized execution on computer systems. More specifically, the present embodiments relate to a method and system for using hardware-event sampling to perform feedback-directed optimization regarding which functions to inline in an executable.

SUMMARY

Computer programs are written in general-purpose programming languages, i.e., C, C++, etc., and then compiled. The compilers for these programming languages use an array of optimization techniques to improve the performance of the computer programs they produce. One class of optimizations is feedback-directed optimization (FDO). FDO is different from other classes of compiler optimizations in that the required feedback comes from specially compiled instrumentation runs of the program with training data. These instrumentation runs produce edge profiles that can be used by an FDO compiler to further optimize the computer program's executable code. One specific type of optimization decision is whether or not to inline a function. Consider a simple function abs that returns the absolute value of the numerical parameter it was called with. Such a function can often be expressed in a small number of lines of code, e.g., one line in C-like languages. The compiler optimization decision is made in the context of other functions that call abs. Specifically, given the high overhead of calling a function, typically on the order of 30-50 clock cycles, it is better to make the executable larger and inline the programming statements of abs into the calling context. The downside is that the compiler is trading space (more assembly language instructions make up the compiled executable) for speed. However, if the inline function is rarely called, the resulting tradeoffs may not be worthwhile.

The basic techniques for feedback-directed optimization (FDO) of computer executables, or binaries, is presently described with reference to FIG. 1, which illustrates a prior art process for feedback-directed optimization. The process 100 starts with building an instrumented binary (step 110), which produces an instrumented executable 120. Next, the instrumented executable 120 and training data 125 (generated separately) are run on appropriate computer hardware (step 130) to produce profile data 140, which directly describes edge profiles. Finally, a standard feedback-directed optimizing compiler is used to build an optimized executable 160 based on the profile data 140 (step 150).

This usage model presents a number of difficulties. For example, how is the training data 125 generated, how do you deal with the slowness of instrumented binaries (which can be 9-200% percent slower than a standard binary), and how do you manage the tightly coupled instrument-run-recompile process?

DETAILED DESCRIPTION

Overview

Figure 1:
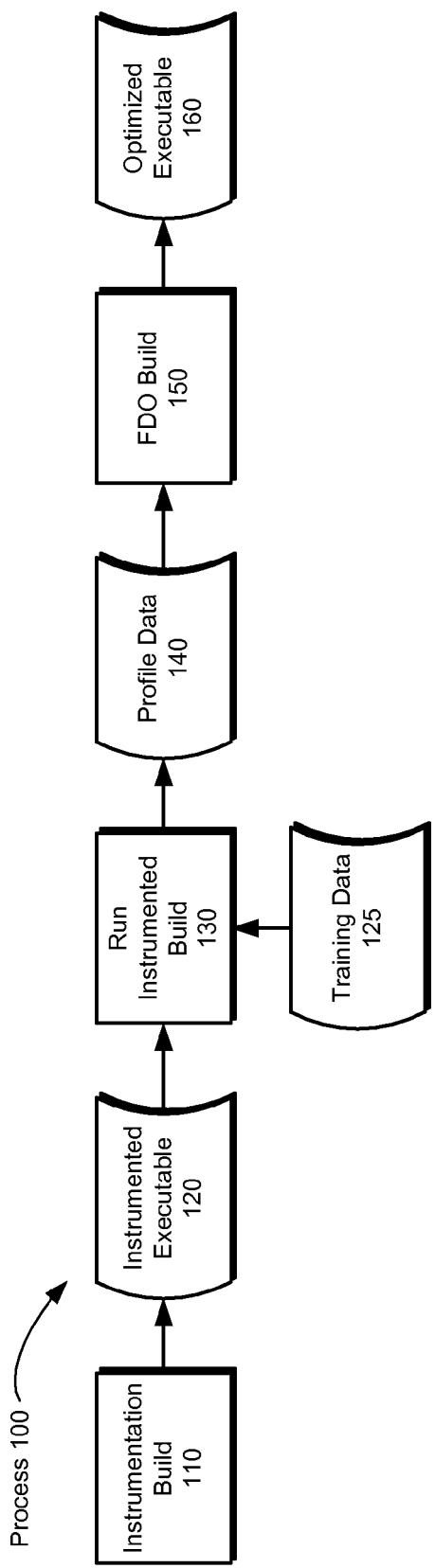
FIG. 1 illustrates a prior art process for feedback-directed optimization.

Compiler techniques that are used to improve the performance of computer executables can require complex mathematical analysis to eke out small performance gains. Recent trends toward feedback-directed optimization techniques have required the use of special executables, e.g., instrumented builds. Unfortunately, running these special executables can present a number of hurdles, such as how to generate the required training data, how to deal with the slow performance of the special executable and how to manage the tightly coupled instrument-run-compile process. The disclosed embodiments provide systems and methods to improve this process. For brevity, throughout this discussion, the terms "binary," "executable," "application," "program," and when used as a noun, the term "build" are all used interchangeably, and the singular female pronoun is used.

The discussion is organized as follows. First a high-level structure of one embodiment is described briefly. Next, the system is described in greater detail including the associated processes. Then, details of techniques used by embodiments are discussed. Lastly, various alternative embodiments are discussed.

Suppose a developer wishes to apply FDO optimizations to her new application, Widget Word. She can build a version of Widget Word using any compiler and any compiler options, including optimization settings, she desires. However, standard debugging information should be retained, e.g., the binary should not be stripped. At this point, she can begin using—and even distributing—Widget Word normally. By using the hardware-event sampling features of modern hardware processors, the developer can get hardware-event samples. For example, on the Intel Core® 2 platform, perfmon2 can gather INST_RETIRED event samples when Widget Word is running. The gathered event samples can then be analyzed together with the debugging information in the application to match the events to lines of source code. Importantly, for using the sample-based FDO methodology, the calling context for inlined functions must be captured at sampling time. Through further refinement and processes, the information can ultimately be converted into edge-profile frequencies. These edge-profile frequencies can then be used by existing feedback-directed optimizing (FDO) compilers to produce an optimized binary, and more specifically to decide whether or not to inline a function.

Notably, since hardware-event sampling imposes relatively modest overhead (2-4%), it can be used in production environments. Furthermore, because the two compilations are now decoupled, it is possible to deploy a first version of an application. This version can be used for some time to gather data from multiple production machines with real world inputs. This data can be used to produce an optimized version that can be distributed as an update. Note that this optimization-update process can be iterated multiple times.

Turning from this high-level description, the system is described in greater detail, infra, in terms of the associated system and processes.

System and Processes

Figure 2:
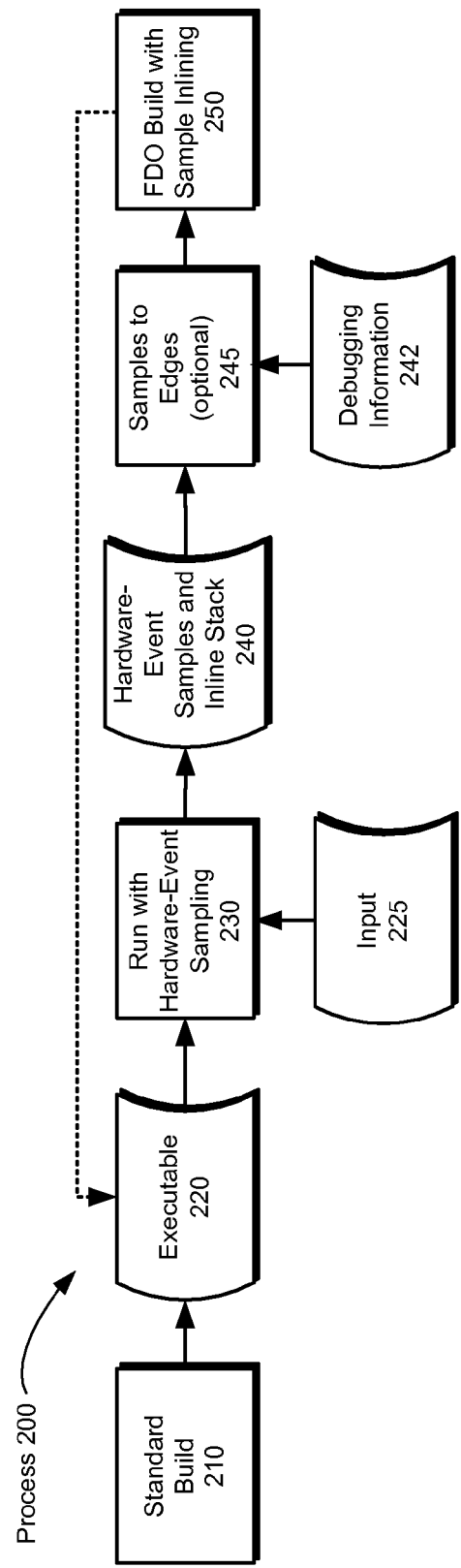
FIG. 2 illustrates an exemplary process for feedback-directed optimization according to one embodiment.

The system and processes for some embodiments will now be described with reference to FIG. 2 (process) and FIG. 3 (system). FIG. 2 illustrates an exemplary process for feedback-directed optimization according to one embodiment. In FIG. 2, various details have been omitted for clarity; for example, the source code is not shown and the location of various stored data (reference numerals 220, 225, 240, and 242) is not shown or discussed. The stored data can be stored in any computer-readable storage medium, such as on the storage 310 (FIG. 3), or in some network attached storage, not shown.

Process 200 starts with a standard build (step 210) of executable 220. This build is notable in that there is no instrumentation and any compiler and compilation flags may be used, e.g., -O2, -g, etc. Importantly, the resultant executable should not be stripped, so as to leave in place debugging information 242 (shown separately from the executable 220), which permits hardware-event samples and inline stack 240 to be matched to specific lines of source code and the calling context for inline functions to be analyzed. In one embodiment, using a high degree of optimization is recommended, e.g., -O2, to gather a greater number of samples to determine the value of inlining. The debugging information 242 is available in the standard binary output of compilers such as gcc and open64. Presently, for gcc this means that the -g option must be used to be able to obtain line number information, with suitable gcc modifications this would not be required.

Next, the executable 220 is run with hardware-event sampling turned on (step 230). This can happen on the same machine being used for compilation, e.g., computer 300 in this example, or on multiple machines. These runs receive input 225 and, aside from the standard output, produce hardware-event samples and inline stack 240, also called a data file. The hardware-event samples and inline stack 240 should also contain the calling context for inlined functions. A hash table is one way of quickly looking up and storing the calling context, also known as an inline function stack. The distinguishing feature of input 225 is that it need not be specially generated training data, but can be any real world input. This is a useful departure from prior techniques such as that of FIG. 1, which required carefully designed training data 125.

In one embodiment, step 230 occurs across multiple computers coupled in communication to permit the output hardware-event samples and inline stack 240, or data files, to be transmitted from one computer where the program executed to another computer for further processing. Consider one embodiment where the executable 220 is a search engine running on thousands of computers worldwide. In this embodiment, the initial build version X.Y.Z is distributed as the executable 220. Hence, step 230 can occur on computers throughout the world on a separately determined schedule. The input 225 can be the search queries from users "hitting" the search engine executables over the web. At a point when the developer decides that she wishes to resume process 200 and optimize the search engine, she can collect (or they may already have been collected) the hardware-event samples and inline stack 240 from the various machines and aggregate them for step 245, which is optional. Step 245 is optional in some embodiments if the only desired FDO optimization is to decide whether or not inline functions. If full sample-based optimization is desired, step 245 should be used. After finishing step 245, the developer can build the optimized executable (step 250) and push the optimized executable into the cloud, e.g., version X.Y.Z-opt1. This path is shown as the dotted line on FIG. 2. Further, the process can repeat multiple times.

Additionally, while the preceding embodiment was described as developer "attended," it can also run unattended according to a schedule set separately. For example, in one embodiment the executable could be optimized on a fixed time schedule. In another embodiment, every time a certain volume of hardware-event samples and inline stack 240 become available, the executable is optimized. In another embodiment, the optimization is triggered by a signal, such as from a management console, or the like.

Returning to the discussion of process 200, the next step is step 245 (optional) where the hardware-event samples and inline stack 240 are analyzed to compute basic block counts. The analysis is at a source-code level and uses the debugging information 242 to map the hardware-event samples and inline stack 240 in the data file to lines of source code. The basic block counts are then converted to edge frequencies. The details of step 245 will be discussed in greater detail, infra, with reference to FIG. 4. Note that the edge frequencies can be generated in the current format used by existing FDO compilers, e.g., the FDO compiler used in step 150. Thus, the existing FDO compiler technologies and techniques can be easily adapted to provide standard source code FDO; additional benefits are reaped by using embodiments of the invention to perform sample profile-based inlining FDO.

The output of step 250 of FIG. 2 is an optimized binary (not shown explicitly). The dotted line path highlights that the output binary can continue to be instrumented, thus continuing the process 200 as long as desired.

Before proceeding, a few other items are worth noting:

- The operation of step 245 does not require perfect accuracy and is tolerant of missing event samples.
- The event sampling of step 230 can be done in precise or non-precise modes (PEBS and non-PEBS on the Intel Core® 2 architecture) and with or without randomization of sampling frequency.
- In non-randomized sampling (during step 230), if every n INST_RETIRED events is sampled, selecting n to be a prime number can mitigate the possibility of program synchronization with sampling, e.g., in the presence of loops.

Figure 3:
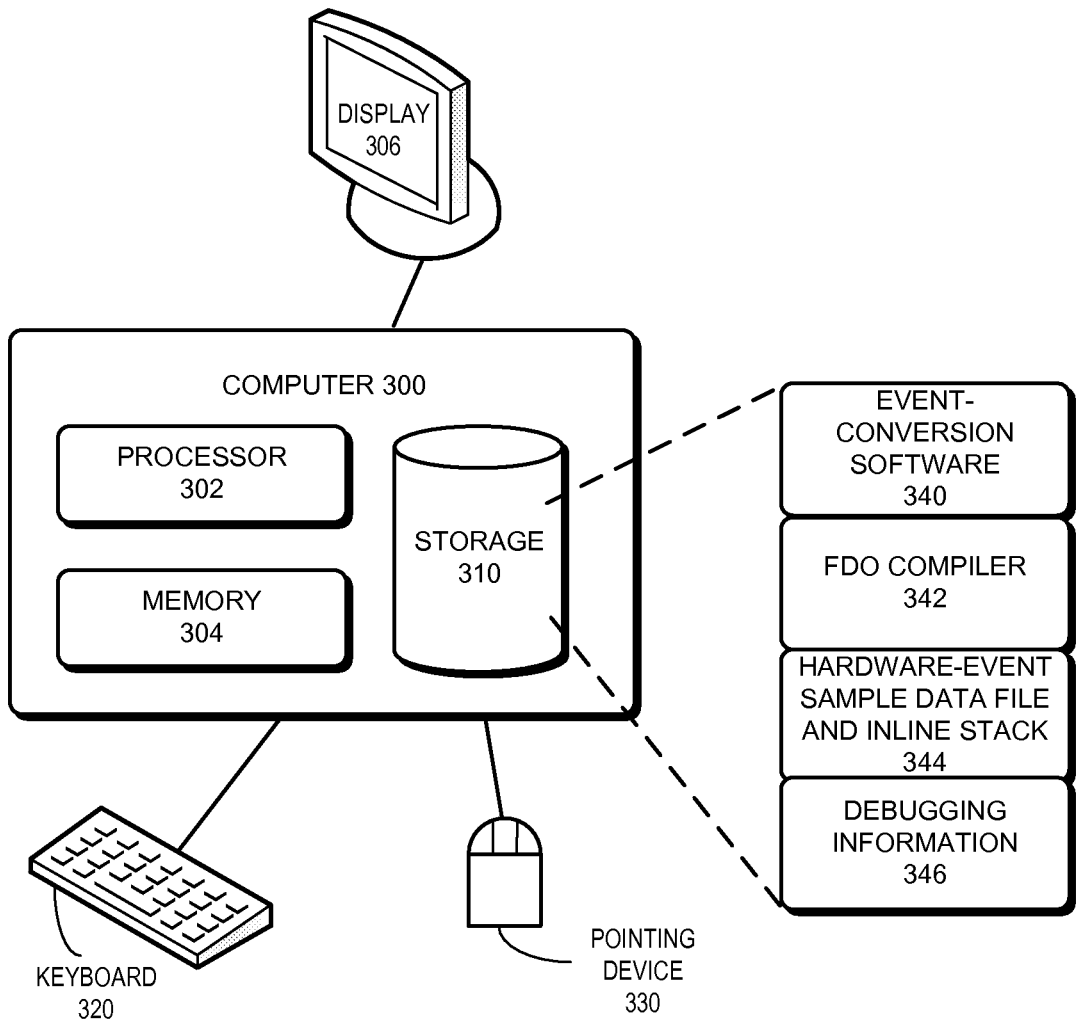
FIG. 3 illustrates a computer system used by some embodiments.

FIG. 3 illustrates a computer system used by some embodiments. The elements of FIG. 3 will now be described and then a discussion of their uses follows. FIG. 3 includes a computer 300, a display 306, and keyboard 320 and a pointing device 330. The computer 300 includes a processor 302, a memory 304, and a storage 310. The storage 310 includes a variety of computer programs, which will be discussed infra. The computer 300 can be an off-the-shelf computer, e.g., an IBM PC-compatible computer. In some embodiments, some or all of the storage 310 is network attached storage outside the computer 300. In some embodiments, the computer 300 is located remotely from the user input-output devices. Network communications equipment is omitted from the figure, but would often be present as it is a standard component on modern-day computers and would support some of the embodiments discussed supra.

The storage 310 includes event-conversion software 340, an FDO compiler 342, a hardware-event sample data file and inline stack 344 (e.g., the hardware-event samples and inline stack 240) and debugging information 346. Omitted, for clarity of illustration, are the source code, executable, operating system, any other compilers, developer tools, and the like, all of which may be in the storage 310.

The interrelationship between the elements of FIG. 3 and process 200 is as follows: FIG. 3 illustrates a computer 300 that can implement process 200. More specifically, the event-conversion software 340 can be used to implement step 245 and the FDO compiler 342 can be used to implement step 250.

Implementation Details

Now, detailed implementations will be discussed in two parts. The first part will cover the inlining decision; the second part, with reference to FIG. 4, will discuss a process 400 for use in carrying out step 245.

Implementation: Inlining

During step 250, the FDO compiler 342 analyzes the source code and determines whether or not a given function call should be inlined. The FDO compiler should be suitably modified to read the hardware event samples and inline stack 240. That data file (e.g., the hardware event samples and inline stack 240) has useful information that can easily be analyzed to determine whether or not to inline a function based on the samples. The upcoming discussion will focus for simplicity at a function level first followed by a more detailed embodiment. Consider the following extremely simple C-like source code with the number of samples to the right of the "//" comments:

```
int abs(int x) {
    (x <= 0) ? (return -x) : (return x)
}
int bar(...) {                          // 1000
    ...
    abs(a)                              // 500
    ...
}
int foo(...) {                          // 10000
    ...
    abs(d*5-10)                         // 0
    ...
}
```

In this example, two functions foo and bar both contain calls to a third function, abs. However, the context-specific inline stack data shows a great deal of difference in how many times abs is called from each function. Specifically, abs was never sampled out of 10,000 samples to foo, but was sampled approximately 500 times in the context of bar.

For better results, the case of multiple calls to a function x within another function y should be considered. In these embodiments, the context-specific calling stack and samples are computed at a basic-block level. This allows even finer-grained inline decisions, e.g., if the same function x is called multiple times in a single function context y composed of five basic blocks (BB) in the control-flow graph (CFG), a different inlining decision can be made for each of those five BBs.

Accordingly, some embodiments adopt one or more rules for determining whether to inline a function from the collected sample data:

In one embodiment, a function x is inlined in BB y in the context of function z if there is at least one hardware-event sample of a call to x in the context of BB y. In the example, this would mean that abs would only be inlined in the bar context, not the foo context.

In another embodiment, a function x is inlined in BB y in the context of z if the number of calls to x in BB y is above a threshold.

In another embodiment, if there are no samples for a function x in BB y in function z, then the compiler uses its non-FDO inlining rules to make an inlining determination for BB y.

Figure 4:
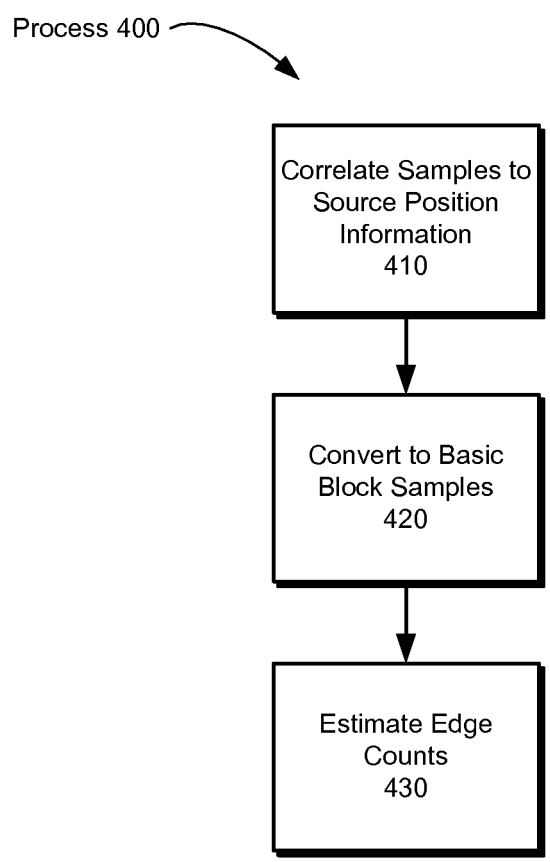
FIG. 4 illustrates a process for converting samples to edge profiles used by some embodiments.

In some instances multiple rules may be active at once together with a sequencing or priority among the rules. Notably, heavily optimized initial builds with a high degree of inlining generate more useful sample data for use in this process. In some embodiments, the BB counts can be calculated by the process 400 (FIG. 4). More specifically this data can be obtained via step 410 and step 420 if the inline stack data is used (step 430 is not necessary for inlining). In the discussion of process 400, infra, the context-specific capture will not be further discussed.

A separate feature of some embodiments is the correct handling—and therefore counts—for early-inlined functions. Without accounting for calling context, the counts for early-inlined functions would be 0. In this context of this feature, the focus is on achieving good estimates of BB and edge profiles for optimization purposes, not on making the do versus do not inline decision. Specifically, with respect to early inlining, some embodiments ensure that the call-context information is preserved and then annotated onto the BB and edge profiles. This does not require modification to the algorithms or processes discussed, but may require compiler modifications to ensure that calling context information can be obtained even for early-inlined functions. Note however, that in some embodiment the early inlining decision can be altered based on these more accurate counts.

Implementation: Sample to Edge Conversion

Specifically, FIG. 4 shows process 400 which can implement step 245 of process 200. The process 400 will first be reviewed and then each step will be discussed in greater detail. At step 410, the samples, e.g., hardware-event samples 240, are analyzed and are correlated to source line, e.g., using the debugging information 242. Next, at step 420, basic-block counts are computed from the correlated hardware-event samples. Finally, at step 430, edge counts are estimated.

Turning to step 410 in more detail. The correlation requires an ability to correlate an event sample, e.g., of an INST_RE-TIRED, back to source code. Consider the source code line:
  pbla.c:60 iplus=iplus→pred;
This single line of C programming language code might translate into multiple instructions, shown here as assembly language:

```
804a8b7: mov 0x10 (%ebp), %eax
804a8ba: mov 0x8 (%eax), %eax
804a8bd: mov %eax, 0x10 (%ebp)
804a8c0: jmp 804a94b <primal_iminus+0x137>
```

The hardware-event samples in the data file (e.g., hardware-event samples 240) would be for the specific instructions, e.g., the first mov instruction might have been sampled 100 times, the next 30, the last 70, and the jmp 80 times.

Thus, at step 410, the correlation of the samples to the line of code would occur, e.g., pbla.c, line 60, has a total of 280 samples (100+30+70+80). In one embodiment, the average is computed here, e.g., 70. In an alternate embodiment, the number of samples, 280, and the number of instructions, 4, are maintained and then aggregated across all source lines in a basic block at step 420. Since the data is sampled, some of the instructions corresponding to line 60 may have no events or a significantly different quantity of events in the data file. The handling of this situation is addressed in step 430.

Next, at step 420, the number of samples per basic block is computed. The blocks can be identified using the intermediate representation (IR) of the source code and a compiler. In one embodiment, a compiler is used at step 245 to build the IR and compute basic block (BB) counts from the IR. In another embodiment, step 245 and step 250 occur simultaneously with modifications to the FDO compiler being used at step 250 to carry out process 400 prior to carrying out the FDO by constructing edge profiles.

Returning to the computation of step 420, if a basic block has five statements from the source code (or IR), then the sum of samples from each can be averaged. For example, in discussing step 410, we considered a statement that had 70 samples, if the other four statements in the block had 10, 70, 0, and 0 samples, then the total number of samples for the basic block would be 150. With five statements, the BB count would be 30 (150/5). If the late averaging embodiment touched on earlier is used, then the number of samples and instructions per source line would be summed as groups and divided to come up with the BB count.

The final step of process 400 is step 430 where an estimated edge-frequency profile is computed from the basic block counts. This can be done by converting the estimation problem into a minimum-cost maximal-flow problem. In some embodiments, this is done in accordance with the general approach in "Complementing Missing and Inaccurate Profiling Using a Minimum Cost Circulation Algorithm" by Roy Levin, Ilan Newman, and Gadi Haber, HiPEAC, pp 291-304 (2008). Bear in mind that the minimum-cost circulation problem and the minimum-cost maximal-flow problem are equivalent. The specific approach used by some embodiments will now be discussed in greater detail.

The flow-conservation rule chosen is that for each vertex in a procedure's control-flow graph (CFG), the sum of the incoming edge frequency counts should be equal to the sum of the outgoing edge frequency count. Conceptually, limiting the amount of change based on static prediction (i.e., by the compiler without the benefit of execution data) coupled with the flow-conservation rule will permit a good approximation of edge counts (i.e., as compared with data gathered from an instrumented executable).

The first portion of step 430 will involve the conversion to a minimum-cost maximal flow problem. Specifically, the original control-flow graph (CFG) will be transformed into a fixup graph, and for all edges in the fixup graph, the minimum capacity, maximum capacity, and cost of each edge will be computed. Some notation and setup follows:

G=(V, E): the original CFG with initial weights $\forall \langle u,v \rangle \in E: w(\langle u,v \rangle) \leftarrow w(u)*p(\langle u,v \rangle)$, where w(u) is the sample count of the basic block u, and $p(\langle u,v \rangle)$ is the probability of the edge $\langle u,v \rangle$ as determined from static profiles, e.g., as in Thomas Ball and James R. Larus, "*Optimally Profiling and Tracing Programs*," ACM Transactions on Programming Languages and Systems, 16(4):1319-1360, July 1994.

G'=(V', E'): the fixup graph min(e), max(e): minimum and maximum capacities for flow on each edge, e in E' k(e): confidence constant for any edge e in E', values are set as:

$b = \sqrt{\text{avg\_vertex\_weight}(cfg)}$ $k^+(e) = b$ $k^-(e) = 50b$ where $k^+(e)$ is used when increasing the flow and $k^-(e)$ is used when decreasing the flow.

Cost-coefficient function for the edges:

$$cp(e) = \frac{k'(\Delta(e))}{\ln(w(e)+2)}$$

where w(e) is the initial assign edge weight and
  if $\Delta(e) \geq 0$ then $k'(\Delta(e)) = k^+$
  otherwise, $k'(\Delta(e)) = k^-$
and where $\Delta(e)$ is the change in edge flow, cost function is per unit flow.

These values ensure that the cost of decreasing the weight on an edge is significantly larger than increasing the weight on an edge, and higher confidence in the initial value of e results in a higher cost for changing the weight of that edge.

The fixup graph and related output can be constructed as follows:

1. Vertex Transformation: construct $G_t = (V_t, E_t)$ from G by doing vertex transformations. For $\forall v \in V$, split each vertex v into two vertices v' and v", connected by an edge with the weight of that edge set to the basic block count of v.

2. Initialize: For each vertex $v \in V_t$ let $$D(v) = \sum_{e_i \in out(v)} w(e_i) - \sum_{e_j \in in(v)} w(e_j);$$

for each $e \in E_r$, do:
  min(e)←0
  max(e)←∞
  k'(e)←$k^+$(e)
  $E_r$←∅
  L←∅

3. Add Reverse Edges: For each $e = \langle u,v \rangle \in E_t$ such that $e_r = \langle v,u \rangle \notin E_t$, do:
  add edge $e_r$
  min($e_r$)←0
  max($e_r$)←w(e)
  k'($e_r$)←$k^-$(e)
  $E_r \leftarrow E_r \cup \{e_r\}$ 4. Create Single Source and Sink: Add a source vertex s' and connect it to all function entry vertices, and add a sink vertex t' and connect it to all function exit vertices.
  $\forall s \in S$ where S is the set of function entry vertices, do:
    add edge $e_s = \langle s',s \rangle$
    min($e_s$)←0, max($e_s$)←w(s), cp($e_s$)←0
    $L \leftarrow L \cup \{e_s\}$
  $\forall t \in T$ where T is the set of function exit vertices, do:
    add edge $e_t = \langle t,t' \rangle$
    min($e_t$)←0, max($e_t$)←w(t), cp($e_t$)←0
    $L \leftarrow L \cup \{e_t\}$ 5. Balance Edges: for each $v \in V/(S \cup T)$ do:
  if $D(v) \geq 0$: add edge $v_t = \langle v,t \rangle$, min($v_t$)←D(v), max($v_t$)←D(v), and $L \leftarrow L \cup \{v_t\}$
  otherwise: add edge $v_s = \langle s',v \rangle$, min($v_s$)←−D(v), max($v_s$)←−D(v), and $L \leftarrow L \cup \{v_s\}$ 6. Normalization: This stage removes anti-parallel edges. Anti-parallel edges are created by the vertex transformation at stage 1 from self-edges in the original CFG G as well as by the reverse edges added at stage 3. $\forall e = \langle u,v \rangle E_t \forall E_r$ such that $e_r = \langle v,u \rangle \in E_t \forall E_r$, do:
  add new vertex n
  delete edge $e_r = \langle v,u \rangle$ add edge $e_{vn}=\langle v,n \rangle$, with $k'(e_{vn}) \leftarrow 0.5*k'\langle u,v \rangle$, min$(e_{vn}) \leftarrow 0$ and max$(e_{vn}) \leftarrow$ max$(\langle u,v \rangle)$ add edge $e_{nu}=\langle n,u \rangle$, with $k'(e_{nu}) \leftarrow k'\langle v,u \rangle$, min$(e_{nu}) \leftarrow 0$ and max$(e_{nu}) \leftarrow$ max$(\langle v,u \rangle)$ $k'(\langle u,v \rangle) \leftarrow 0.5*k'(\langle u,v \rangle)$ $E' \leftarrow E' \cup \{e_{vn}, e_{nu}\}$ $V' \leftarrow V' \cup \{n\}$ 7. Finalize: $E' \leftarrow E' \cup E_t \cup E_r \cup L$ and $V' \leftarrow V' \cup V_t$ With the fixup graph and the minimum capacity (min(e)), maximum capacity (max(e)) and edge costs (cp(e)) calculated, step 430 can continue by solving the minimum-cost maximal-flow problem.

One embodiment uses Klein's negative cycle cancellation techniques as follows:

1. Find maximal flow, using Edmonds-Karp's breadth-first search techniques to find augmenting paths;
2. Compute residual network;
3. Repeatedly cancel negative cost cycles, using Ford-Fulkerson techniques to find negative cost cycles; and
4. Form minimum-cost maximal-flow network.

Other embodiments may use other techniques in place of Klein's, for example Goldberg and Tarjan's technique, to solve the minimum-cost circulation problem could be used.

Implementation Considerations

Some additional implementation considerations merit discussion. In one embodiment an existing compiler with instrumentation-based FDO support such as gcc is modified to support process 200. In this embodiment, step 245 (including process 400) and step 250 are merged into a single compiler executable. In one embodiment, the -fsample-profile option has been added to trigger this embodiment. In another embodiment two flags are created, one to trigger the inlining options and another to trigger the sample-profile driven FDO. In this embodiment, process 400 is carried out by adding new functions to the existing code to perform process 400 using hardware-event sample data files during compilation. Consider the basic flow of gcc version 4.4:

source $\Rightarrow$ generic $\Rightarrow$ gimple $\Rightarrow$ RTL $\Rightarrow$ assembly If invoked with the new -fsample-profile option, then new code for sp_annotate( ) in pass_tree_sample_profile is invoked to read the data file (e.g, hardware-event samples and inline stack 240) and enable existing FDO capabilities. This function performs step 410 and step 420 of process 400 before calling sp_smooth_cfg( ) to perform step 430 (e.g., construct fixup graph and apply a minimum-cost maximal-flow technique). Because the output of sp_smooth_cfg( ) is edge profiles already well understood by the instrumented compiler, no further modifications to the extent FDO code are needed. Similarly, the code in gcc that performs inlining (including early inlining) can be modified to read the data file (e.g., hardware-event samples and inline stack 240) and use that data to make inlining decisions or reuse the output from sp_annotate( ). If the latter technique is used, some embodiments ensure that the call to sp_annotate( ) occurs before gcc makes early inlining decisions so that the context-specific inline function data is available for decision making.

In using process 200 and process 400, some attention should be paid to sampling methodology and missing or insufficient source positioning information and calling stack information. For example, INST_RETIRED event counts may not always be representative of the actual instruction count because of: program synchronization, hardware, the choice of profiling tools to collect the data, and/or other reasons. Randomizing sampling frequency (a supported feature of Intel Core® 2 processors) or picking a prime number for the sampling frequency can minimize the problem of program synchronization. Hardware factors such as out-of-order execution may cause skewing of the recorded instruction address, e.g., hardware-event sample says instruction was at 804a8ba, but the actual location was several bytes off. In testing, the AMD Opteron™ with up to 72 macro-ops in flight can demonstrate this problem. On the Intel Core® 2 platform, the precise event-based sampling (PEBS) mode can minimize this at the cost of not permitting randomized sampling. Also, the profiling tool used, e.g., perfmon2 (preferred) vs. oprofile, can affect the outcome based on its ability to interface with the processor's hardware sampling mechanisms.

Missing or insufficient source position information also can reduce accuracy. Improving the underlying compiler used in process 200 (for the initial and/or FDO build) can reduce this problem. For example, gcc with -O2 showed some problems. Specifically, consider this small excerpt from the SPEC2000 benchmark 300.twolf procedure new_dbox( ) annotated with hardware-event samples after the "//" comment characters:

```
93 if (netptr->flag == 1) {        // 31366
94     newx = netptr->newx;        //  3000
95     newptr->flax = 0 ;          // 37000
96 } else {                        //     0
97     newx = oldx ;               //     0
98 }                               //     0
```

Taken at face value, lines 96-98 were never sampled during the collection runs. However, testing with traditional instrumented builds showed that those blocks executed around 19% of the time. Further analysis of this specific code revealed that standard optimizations by the compiler caused mis-attribution of samples. Accordingly, some modifications to the existing compilation processes may be helpful to provide better samples at step 245 and step 250.

A related problem can arise from control-flow statements on single lines, e.g.

```
if (cond) {stmt1} else {stmt2}
(cond) ? (taken_body) : (not_taken_body);
```

In these situations, it is not possible to disambiguate the samples to the correct blocks presently. The compiler would need to be enhanced to discriminate control transfers within a single source line.

Testing has demonstrated that current gcc compilers output sufficient information to save the inline calling context even when optimizations are used.

ALTERNATIVE EMBODIMENTS AND CONCLUSION

Recapping, embodiments of the invention permit the use of hardware-event sampling information of inline functions together with their associated call context to make function inlining decisions.

The data structures and code described, supra, are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), network storage, or other media capable of storing computer-readable media now known or later developed.

The preceding description is presented to enable one skilled in the art to make and use the invention. Various modifications to the disclosed embodiments will be apparent, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. The scope of the present invention is defined by the appended claims.

What is claimed is:

1. A computer-implemented method for determining whether to inline functions into a calling context during compilation of source code for a program, the method comprising:
   loading a data file containing data gathered during execution of the program, the data file containing a plurality of hardware event samples for inlined functions, wherein each sample includes an associated calling context;
   loading a debugging information which permits identification of source code positions from the hardware-event samples;
   analyzing the data file and the debugging information to compute a plurality of context-specific basic block counts;
   determining whether to inline at least one function in the source code in at least one context during compilation of the source code using the plurality of context-specific basic block counts; and
   converting the data file into a plurality of context-specific edge frequencies for use by a feedback-directed optimizing compiler.

2. The method of claim 1, wherein the determining whether to inline the at least one function involves determining to inline:
   (i) if the at least one function in the at least one context was used in the plurality of context-specific basic block counts; or
   (ii) if the number of calls to the at least one function in an associated context is greater than a predetermined value.

3. The method of claim 1, further comprising:
   compiling the program with a first compiler and optimization enabled, wherein the compiling occurs prior to the loading the data file, the loading the debugging information, the analyzing and the determining; and
   performing the loading the data file, the loading the debugging information, the analyzing and the determining with a second compiler.

4. The method of claim 1, further comprising iterating the loading the data file, the loading the debugging information, the analyzing and the determining, to further optimize the executable code of the program.

5. A system that optimizes an executable for a program during compilation of the program from source code, the system comprising:
   a computer; and
   a computer-readable storage medium including a feedback-directed optimizing compiler, wherein the feedback-directed optimizing compiler is configured to:
      load a data file containing data gathered during execution of the program, the data file containing a plurality of hardware event samples for inlined functions, wherein each sample includes an associated calling context;
      load a debugging information which permits identification of source code positions from the hardware-event samples;
      analyze the data file and the debugging information to compute a plurality of context-specific basic block counts;
      determine whether to inline at least one function in the source code in at least one context using the plurality of context-specific basic block counts; and
      convert the data file into a plurality of context-specific edge frequencies for use during code optimization.

6. The system of claim 5, wherein to determine whether to inline the at least one function involves determining to inline:
   (i) if the at least one function in the at least one context was used in the plurality of context-specific basic block counts; or
   (ii) if the number of calls to the at least one function in an associated context is greater than a predetermined value.

7. The system of claim 5, wherein the computer-readable storage medium includes a second compiler, and wherein the program compiled with the second compiler and optimization enabled; and wherein the data file, generated from executing the program as compiled by the second compiler.

8. The system of claim 5, wherein the compiler invoked repetitively to further optimize the executable code of the program.

9. A non-transitory computer-readable storage medium storing instructions that when executed by a computer cause the computer to perform a method for optimizing an executable code of source code for a program during compilation of the executable, the method comprising:
   a first set of instructions for loading a data file containing data gathered during execution of the program, the data file containing a plurality of hardware event samples for inlined functions, wherein each sample includes an associated calling context;
   a second set of instructions for loading a debugging information which permits identification of source code positions from the hardware-event samples;
   a third set of instructions for analyzing the data file and the debugging information to compute a plurality of context-specific basic block counts;
   a fourth set of instructions for determining whether to inline at least one function in the source code in at least one context using the plurality of context-IS specific basic block counts;
   a fifth set of instructions for a feedback-directed optimizing compiler; and
   a sixth set of instructions for converting the data file into a plurality of context-specific edge frequencies and wherein the feedback-directed optimizing compiler uses the plurality of context-specific edge frequencies during code optimization.

10. The non-transitory computer-readable storage medium of claim 9, wherein the fourth set of instructions further involves determining to inline:
    (i) if the at least one function in the at least one context was used in the plurality of context-specific basic block counts; or
    (ii) if the number of calls to the at least one function in an associated context is greater than a predetermined value.

11. The non-transitory computer-readable storage medium of claim 9, further comprising:
    a seventh set of instructions for compiling the program with a first compiler and optimization enabled, wherein the compiling occurs prior to the first through fourth set of instructions; and a eighth set of instructions for performing the first through fourth set of instructions with a second compiler.

12. The non-transitory computer-readable storage medium of claim 9, further comprising a seventh set of instructions to repeat the first through fourth set of instructions to further optimize the executable code of the program.

\* \* \* \* \*